No. 617,599. Patented Jan. 10, 1899.
R. R. PARRY & E. EVANS.
DISH WASHING MACHINE.
(Application filed Apr. 20, 1898.)
(No Model.) 5 Sheets—Sheet 1.
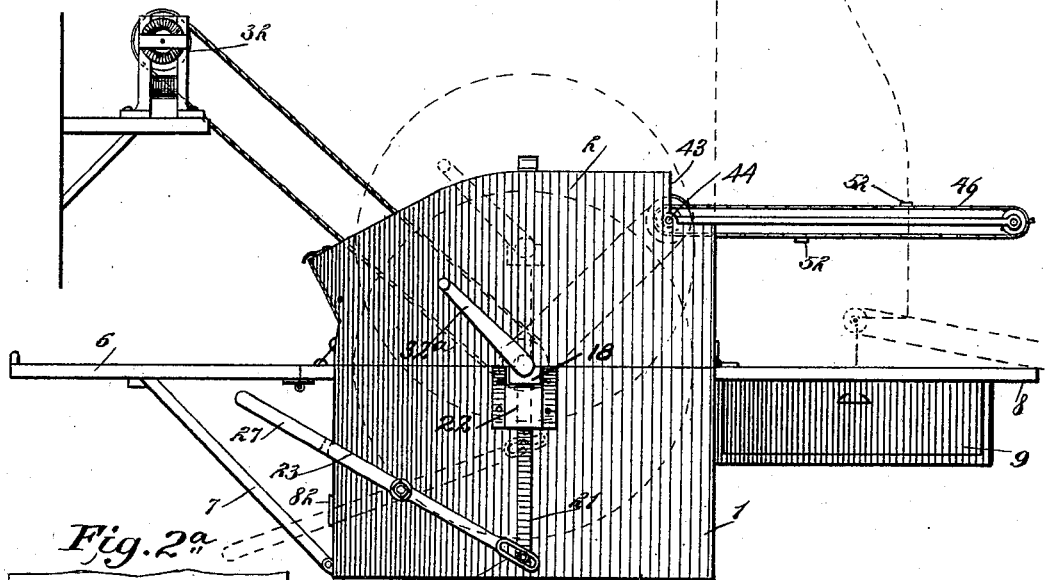
Fig. 1
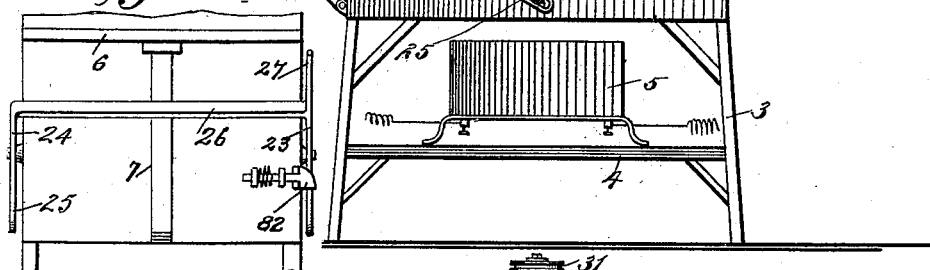
Fig. 2ª
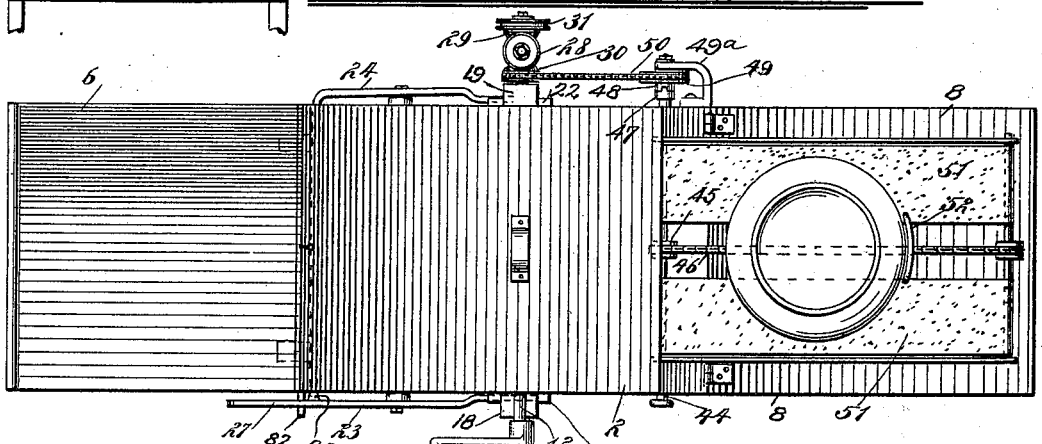
Fig. 2
WITNESSES:
Joshua Bergstrom
C. R. Ferguson
INVENTORS
R. R. Parry
E. Evans
BY
[signature]
ATTORNEYS.

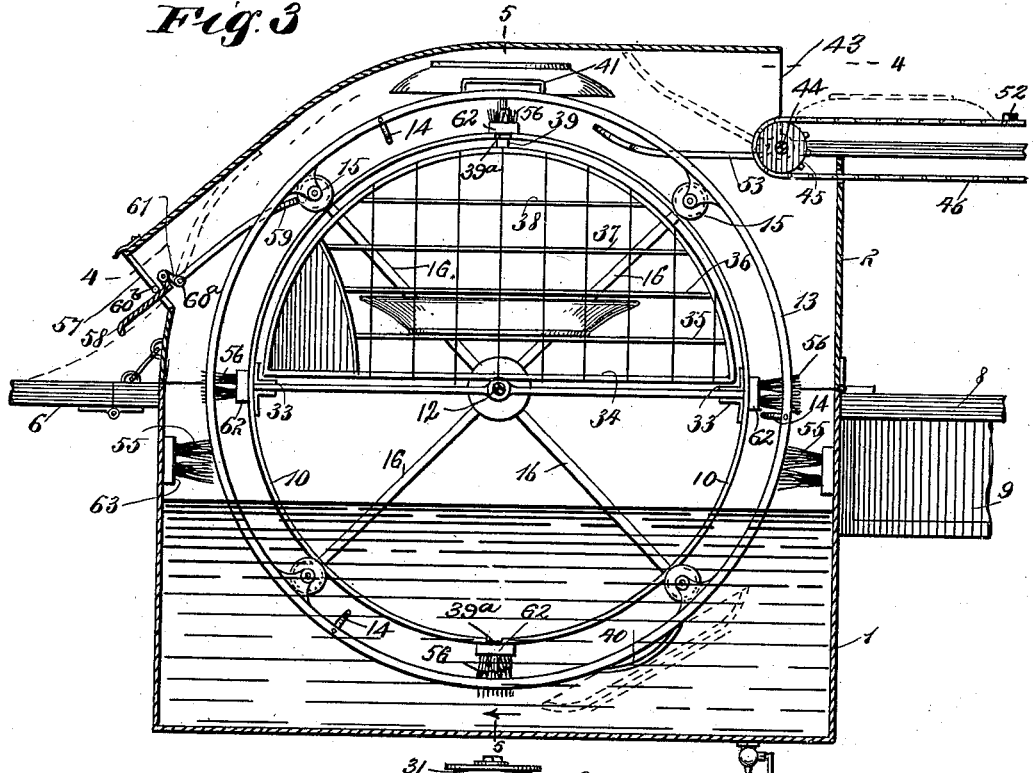

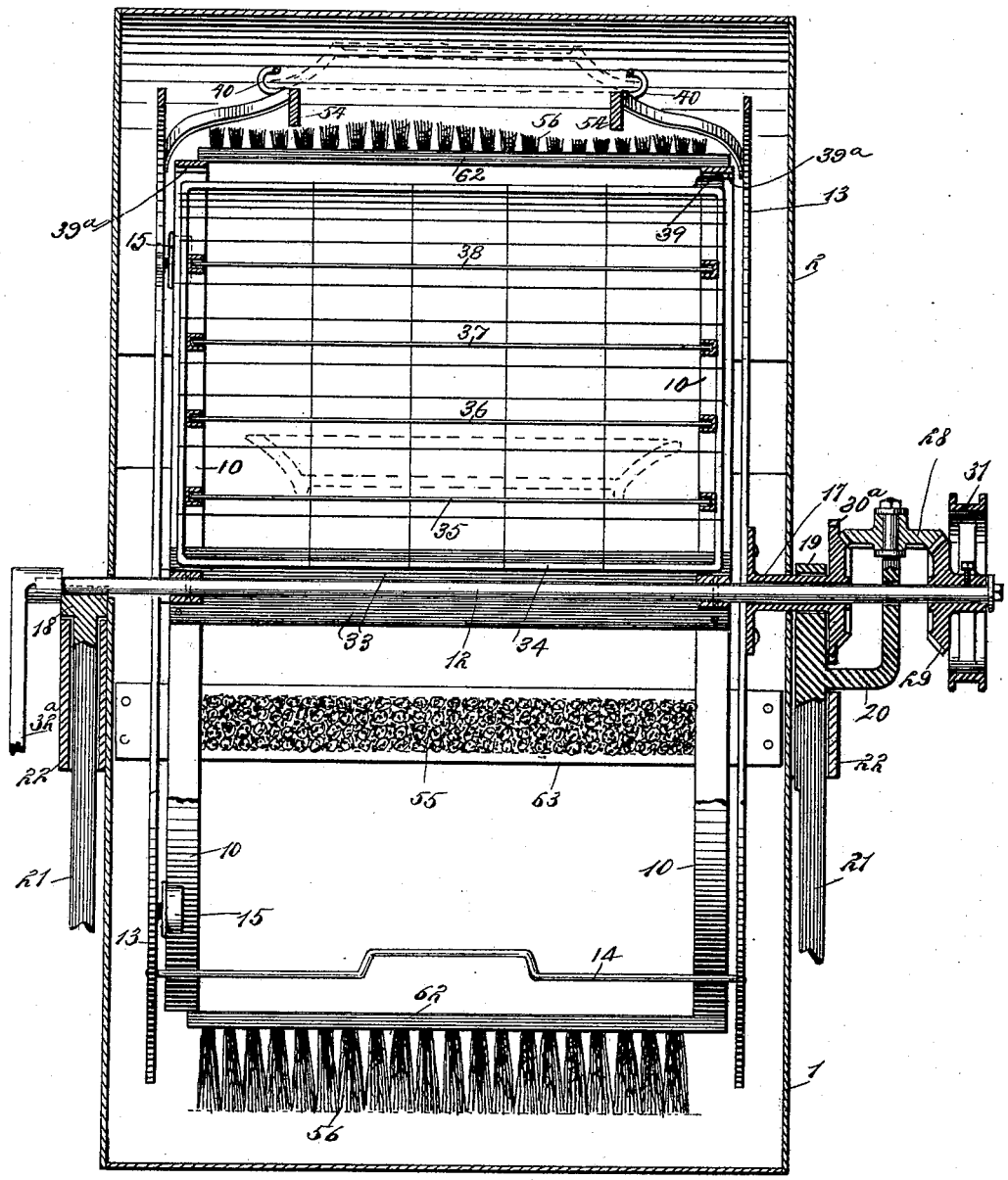

No. 617,599. Patented Jan. 10, 1899.
R. R. PARRY & E. EVANS.
DISH WASHING MACHINE.
(Application filed Apr. 20, 1898.)
(No Model.) 5 Sheets—Sheet 4.
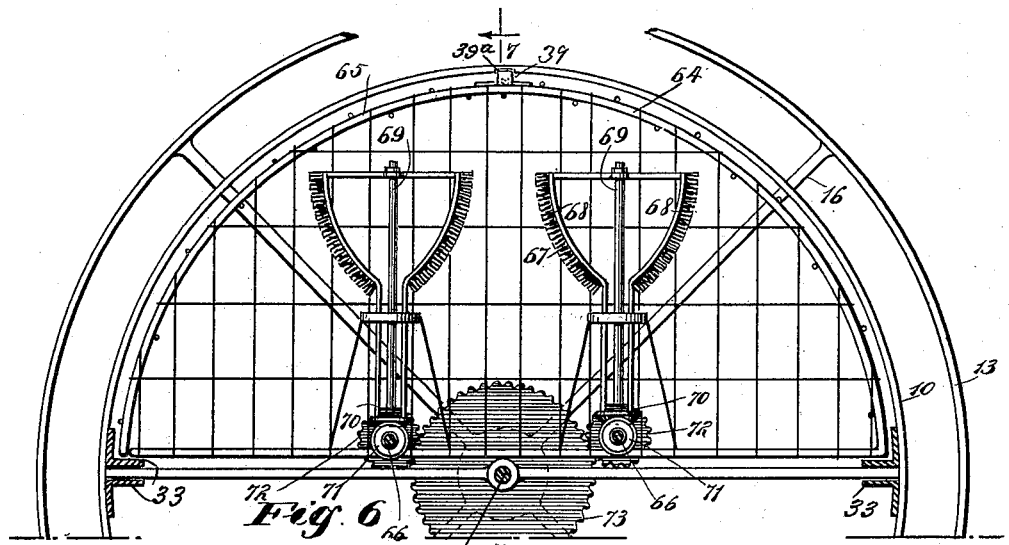
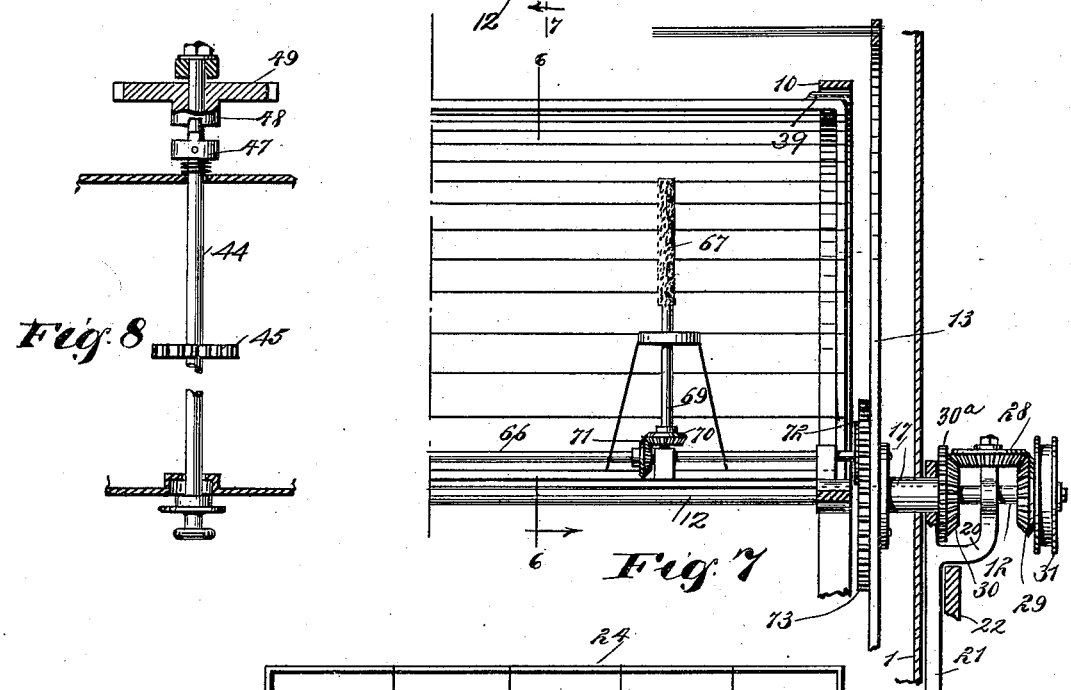
WITNESSES:
INVENTORS
R. R. Parry
E. Evans
BY
ATTORNEYS.

No. 617,599. Patented Jan. 10, 1899.
R. R. PARRY & E. EVANS.
DISH WASHING MACHINE.
(Application filed Apr. 20, 1898.)

(No Model.) 5 Sheets—Sheet 5.

WITNESSES:
INVENTORS
R. R. Parry
E. Evans
BY
ATTORNEYS.

THE NORRIS PETERS CO., PHOTO-LITHO., WASHINGTON, D. C.

UNITED STATES PATENT OFFICE.

ROBERT R. PARRY AND EDWIN EVANS, OF POULTNEY, VERMONT.

DISH-WASHING MACHINE.

SPECIFICATION forming part of Letters Patent No. 617,599, dated January 10, 1899.

Application filed April 20, 1898. Serial No. 678,223. (No model.)

*To all whom it may concern:*

Be it known that we, ROBERT R. PARRY and EDWIN EVANS, of Poultney, in the county of Rutland and State of Vermont, have invented a new and Improved Dish-Washing Machine, of which the following is a full, clear, and exact description.

This invention relates to machines for washing dishes; and the object is to provide a machine in which the dishes or other tableware may be quickly and thoroughly washed, and, further, to so construct the machine that the several articles to be cleansed will be held rigidly in place during the washing operation, thus avoiding all danger of breakage. A further object is to provide a means for automatically introducing and discharging dishes after an attendant shall have first placed the dishes on a feeding-carrier.

We will describe a dish-washing machine embodying our invention and then point out the novel features in the appended claims.

Reference is to be had to the accompanying drawings, forming a part of this specification, in which similar characters of reference indicate corresponding parts in all the views.

Figure 10:
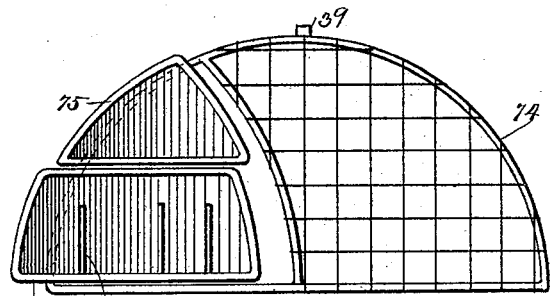
Figure 11:
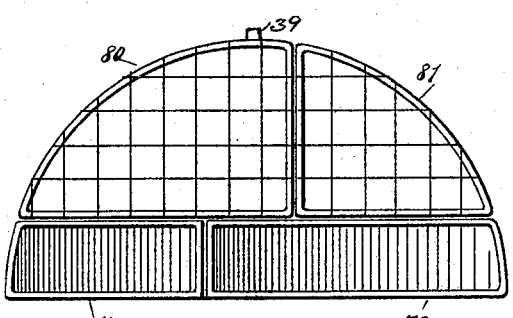
Figure 15:
Figures 12, 13:
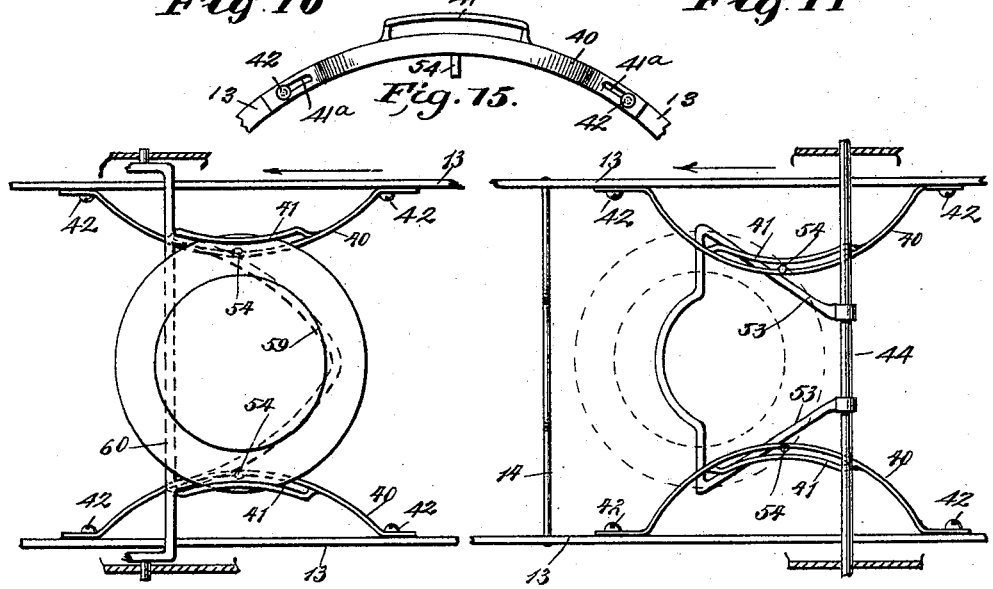
Figure 14:
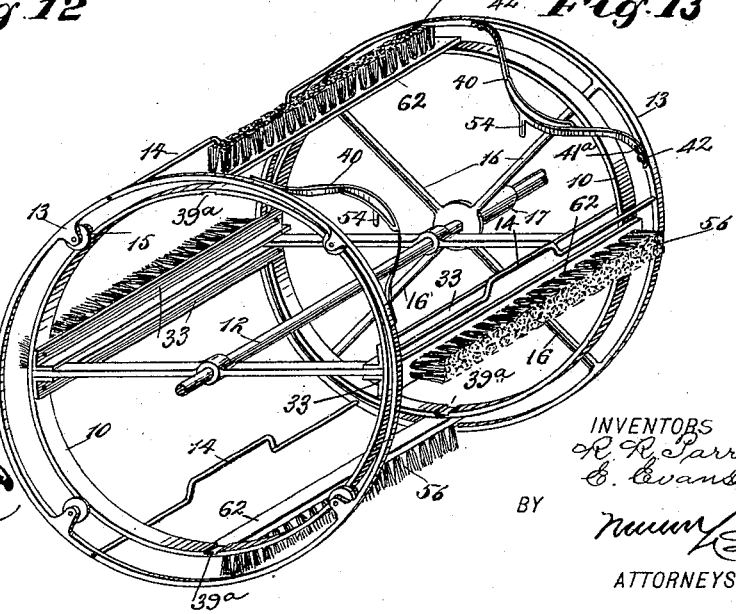

Figure 1 is a side elevation of a washing-machine embodying our invention. Fig. 2 is a top plan view thereof. Fig. 2ᵃ is an end view of a portion of the machine. Fig. 3 is a section on the line 3 3 of Fig. 4. Fig. 4 is a partly-sectional plan view substantially on the line 4 4 of Fig. 3. Fig. 5 is a transverse sectional view substantially on the line 5 5 of Fig. 3. Fig. 6 is a sectional side elevation of a portion of the machine, showing a modification, the section being taken through line 6 6 of Fig. 7. Fig. 7 is a transverse sectional view essentially on the line 7 7 of Fig. 6. Fig. 8 is a detail view showing a clutch mechanism employed. Fig. 9 is a plan view of a receptacle employed for receiving dishes. Fig. 10 is an end view of a series of receptacles provided for the machine. Fig. 11 is an end view showing another form of a series of receptacles. Fig. 12 is a plan view showing a means for holding dishes on a revolving carrier and means for releasing the dishes therefrom. Fig. 13 is a plan view showing the means for holding the dishes on said carrier and showing a means for separating the holding devices preparatory to receiving a dish. Fig. 14 is a perspective view of the rotary carriers employed, and Fig. 15 is an inside elevation or a dish-holding clip employed.

The machine comprises a reservoir 1, of any suitable material—such, for instance, as metal—and to this reservoir is hinged a cover 2. The reservoir as here shown is supported on legs 3, and to these legs is attached a platform 4 to support a heating device 5 underneath the reservoir. We have here shown the heating device as an electric heater; but it is obvious that oil or gas may be used as a heating medium. Hinged to one side of the reservoir is a shelf 6, supported by a brace 7. At the other side of the reservoir is a fixed shelf 8, supporting a drawer 9, designed to receive small tools or instruments, thus preventing their possible loss or misplacement.

Mounted to rotate in the reservoir and cover is a carrier-frame consisting of two rings 10, connected together by cross bars or strips 62, and these rings are mounted on a shaft 12. Mounted to rotate around the frame or carrier 10 is a second carrier consisting of end rings 13, connected together by rods 14, and one of these end rings has rollers 15, which engage upon the outer surface of one of the rings 10. The other ring 13 has spokes 16, which connect to a hollow shaft 17. The shaft 12 at one end extends through an end wall of the reservoir and has bearings in the bearing-block 18, and the tubular shaft 17 has bearings in a bearing-block 19, which carries a bracket 20, in which the shaft 12 has a bearing. The shaft 12 is somewhat smaller than the opening through the tubular shaft 17, so that there can be no frictional contact between the same. The bearing-blocks 18 and 19 are connected to lifting-bars 21, movable through guides 22 on the outer side of the reservoir. The lifting-bars 21 have connection at their lower ends with levers 23 and 24, fulcrumed on the sides of the reservoir. The connections between the rods 21, and the levers 23 and 24 consist of bolts or lugs extended from said rods through slots 25 in the ends of the levers. The levers are connected together by a transverse rod 26, and one of the levers (here shown as the lever 23) is provided with a handpiece 27.

Mounted on the bracket 20 is a bevel-gear 28, meshing with a bevel-gear 29 on the shaft 12, and also with a bevel-gear 30 on the shaft 17. To the bevel-gear 29 is attached a band-wheel 31, which may be rotated by any suitable motor. We have here shown an electric motor 32, having a band connection with the wheel 31. If desired, however, the shafts may be turned by means of a crank 32ᵃ on the shaft 12. Obviously by this arrangement of gearing the carrier or frame 10 and the carrier or frame 13 will be rotated in opposite directions.

Secured to the rings 10 at opposite sides are angle-iron tracks 33, upon which receptacles for dishes or similar articles of open-mesh work are designed to slide. These receptacles are of different forms to suit the shapes of different articles to be washed. In Fig. 3 we have shown several receptacles 34, 35, 36, 37, and 38 arranged in a half-circle of the carrying-rings 10; but it is to be understood that during the washing of dishes the whole circumference of the carrying-rings will be filled. The several receptacles 34, 35, and 36 will be substantially the depth of the plate which they are designed to receive. The receptacles 37 and 38 may be made to conform to tea-cups or other small articles. When the several receptacles are assembled, they will present a half-circle conforming to the half-circle of the rings 10, and to prevent their possible lateral or rotary movement the outer ones of the series will be provided with lugs 39, designed to engage in recesses 39ᵃ in the rings 10.

Secured to the inner sides of the rings 13 are clips 40, consisting of spring metal and designed to engage with the edge of a plate. The central portions of these clips are provided with yokes 41, in which the edges of the plate will engage. The opposite clips are bowed at the center toward each other and the ends are provided with slots 41ᵃ, through which pins or screws 42 extend into the rings 13. Obviously by pressing the clips outward the plates may be inserted or removed.

At the rear side of the cover 2 and near its top is an opening 43. Extended transversely of said cover, at the lower portion of said opening, is a shaft 44, having a sprocket-wheel 45 at its central portion, around which a feeding-chain 46 passes. The outer end of the shaft 44 is provided with a clutch-section 47, adapted to engage with a clutch-section 48, to which is attached a sprocket-wheel 49, loosely mounted on the shaft 44 and operated by a chain 50, driven from a sprocket-wheel 30ᵃ on the shaft 17. At the sides of the feeding-chain 46 are table-sections 51, and attached to said chain is a series of cross-bars 52. By placing a plate on the table-section 51 and against a cross-bar 52 it is obvious that the movement of the chain 46 will move a plate through the opening 43 into the machine. The shaft 44 has its bearing at the outer side of the wheel 49 in a bracket 49ᵃ, secured to the cover 2. The shaft 44 is movable longitudinally, so that by moving it the clutch-section, may be disengaged, and thus the feeding-chain will be stopped.

Within the cover is a spreader for the clips 40. As here shown, this spreader consists of diverging arms 53, mounted to swing on the shaft 44 and connected together at their inner ends and adapted to be engaged by pins 54 on the clips 40. These arms 53 as the frame comprising the rings 13 rotates will spread the clips 40, so that a plate fed onto the spreader may pass into a clip, as plainly indicated in Fig. 13. Of course after the pins 54 shall have left the ends of the arms 53 the clips will spring together and hold the plate. It is to be understood that there may be as many plate-holding clips as desired. When all the clips are occupied, the spreader may be swung upward, as indicated in dotted lines in Fig. 3, and held by any suitable means out of the line of movement of the plates, or when the clips are filled the plates will, as they reach the spreader, engage it and force it upward.

When the plates are held by the clips and the carriers are rotated, the outer surfaces of the plates will be cleansed by brushes 55, secured to the inner wall of the reservoir 1, and the inner surfaces of the plates will be washed by brushes 56, carried by the frame or carrier comprising the rings 10. After the plates shall have been sufficiently washed they are to be discharged through an opening 57 in the front of the cover 2. This opening 57 is normally closed by a door 58. Operated by the door 58 is a discharge-spreader for the clips 40. As here shown, this discharge-spreader consists of a longitudinally-curved wire 59, attached to a cross-wire 60, pivoted, as at 60ᵃ, in the cover 2, and outward of the pivotal points of this cross-wire 60 the said cross-wire has lug connections 61 with the lower portion of the door 58, these lugs being extended rigidly from the wire and pivoted to the door. When the door 58 is closed, the discharge-spreader 59 will be moved upward, as indicated by dotted lines in Fig. 3. When, however, the plates are to be discharged, the door is to be thrown open, as shown in Fig. 3, and then the spreader will assume the position shown in full lines in Fig. 3. When the pins 54 come in contact with the discharge-spreader 59, the clips will be spread apart and the plates will slide over the spreader through the opening 57 and over the door 58 onto the shelf 6. During the opening and closing of the door 58 it will slide against the stop-pins 60ᵇ, extended from the cover 2.

The brushes 56 are here shown as secured to the strips 62, attached to the rings 10 and which form the backs of the brushes. The brushes 55 have their backs formed of strips 63, secured within the reservoir.

In Figs. 6 and 7 we have shown means for supporting hollow ware—such, for instance, as pitchers and tumblers—and means for holding brushes within the same for cleansing purposes. These devices consist of wirework receptacles, each consisting of two sections 64 and 65, hinged together. Arranged within these receptacles are longitudinally-disposed shafts 66, designed to rotate supporting and washing brushes 67. These brushes 67 are secured to diverging arms 68, mounted on the shaft 69, having miter-pinions 70 at their lower ends meshing with miter-gears 71 on the shafts 66. The ends of the shafts 66 are provided with pinions 72, meshing with a gear 73, secured to one of the rings 13. When the hollow ware is to be washed with the devices just described, the sections 64 and 65 must be swung open, so that the pitchers or other ware may be placed on the supporting-brushes, and then as the carrier frames or rings are rotated, carrying the receptacles, the brushes 67 will be rotated within the pitchers, inasmuch as the shafts 66 will be rotated by means of the pinions traveling around the rack 73.

In Fig. 10 we have shown a set of receptacles of different shape from those first described and designed to hold dishes and other articles that could not be supported in the receptacles first described. These receptacles consist of large receptacles 74 and two small receptacles 75 and 76. The receptacle 75 may be made to contain knives and forks and similar tableware, while the receptacle 76 is provided with a series of partitions 77, against which saucers or similar articles may be placed. We have shown these receptacles separated, so as to clearly indicate their shape.

In Fig. 11 we have shown still another receptacle to hold articles which cannot be well supported in the receptacles described. These receptacles (shown in Fig. 11) consist of two rectangular receptacles 78 and 79 and two receptacles 80 and 81.

In operation the dishes or other articles to be washed will be placed in their several receptacles, and the several receptacles will be placed in the carrying rings or frame 10, which will have been previously raised while the cover 2 is open by pushing downward on the levers 23 and 24. To allow for the swinging open of the cover, the chain 50 may be separated between two of its links and removed from the sprocket-wheels. The levers 23 and 24 may be held in a downward position to support the rings 10 above the plane of the reservoir by engaging one of the levers with a latch or other fastening device 82 on the front of the reservoir. Then the whole structure is to be lowered into the reservoir and rotated through boiling water, and it is obvious that by rotating these parts a practically continuous stream of water will be forced over and around the articles to be washed. The water in the reservoir may be kept at the proper temperature by means of the heating device before described.

Of course during the operation of rotating the carriers the door 58 must be closed, and plates to be engaged by the clips 40 will be fed through the opening 43, as before described. After the plates have been sufficiently washed the door 58 is to be opened, which will move the discharge-spreader into the line of movement of the pins 54, so that said clips will be spread apart to release the plates.

The machine may be made of any desired size to accommodate it to the possible number of dishes or other articles to be washed. Thus large sizes may be made for hotels, restaurants, and the like, a smaller size for large families, and a still smaller size for small families.

In restaurants or similar places it is obvious that the dishes or other articles to be washed may be gathered up in certain of the receptacles. Therefore they will serve in the place of the wooden trays as at present used. The machine embodying our invention will reduce the labor of dish-washing to a minimum, and as the dish-reservoir and the cover are closed during the operation of washing the dishes there is no discomfort from rising steam.

Having thus described our invention, we claim as new and desire to secure by Letters Patent—

1. A dish-washing machine, comprising a reservoir, a cover therefor, two carriers mounted to rotate in the reservoir and cover, means for raising and supporting the carriers above the water in the reservoir, a series of open-work receptacles for containing articles to be washed, said receptacles being arranged to conform to the outline of the carriers, brushes secured to one of said carriers, and means upon the other carrier for holding dishes to pass the same against said brushes, substantially as specified.

2. A dish-washing machine, comprising a reservoir, a cover thereon, two carriers mounted to rotate in said reservoir one outside the other, vertically-movable rods on the reservoir and having bearings for the shaft of the carriers, guides for the rods, and levers having pivotal connection with said rods, substantially as specified.

3. A dish-washing machine, comprising a reservoir, a cover therefor, a carrier mounted to rotate in the reservoir and cover and adapted to receive dish-receptacles, brushes secured to said carrier, another carrier surrounding the first-named carrier, and spring-yielding clips on said other carrier for receiving and holding dishes to be operated upon by the brushes, substantially as specified.

4. A dish-washing machine, comprising a reservoir, two carriers mounted to rotate in opposite directions in the reservoir, and means for lifting and supporting the carriers, comprising sliding bearing-blocks, guides for said blocks, and levers, substantially as specified.

5. A dish-washing machine, comprising a reservoir, a cover therefor, a carrier in the reservoir for receiving dish-holding receptacles, another carrier surrounding the first-named carrier, means for rotating said carriers in opposite directions, spring-clips on the outer carrier for holding dishes, diverging spreader-arms for spreading the clips to receive the dishes, an endless carrier for moving dishes through an opening in the rear side of the cover so as to engage the said clips, a door for an opening in the front portion of the cover, and a discharge-spreader for the clips adapted to be swung into operative position, to engage with pins on the clips when it is desired to discharge the dishes, substantially as specified.

6. A dish-washing machine, comprising a reservoir, two carriers in the reservoir, one carrier being arranged within the other carrier, means for rotating said carriers in opposite directions, brushes carried by the inner carrier, plate-holding clips attached to the outer carrier, means for feeding dishes to said clips, means for releasing the dishes from the clips, and brushes in the reservoir to engage against the outer surface of the dishes carried by the clips, substantially as specified.

ROBERT R. PARRY.
EDWIN EVANS.

Witnesses:
WILLIAM NATHANIEL,
ELLIS R. ROBERTS.